United States Patent
Sternby et al.

(10) Patent No.: US 12,373,520 B2
(45) Date of Patent: Jul. 29, 2025

(54) NEURAL NETWORK WATERMARKING

(71) Applicant: Telefonaktiebolaget LM Ericsson (publ), Stockholm (SE)

(72) Inventors: Jakob Sternby, Lund (SE); Björn Johansson, Bjärred (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 182 days.

(21) Appl. No.: 17/915,336

(22) PCT Filed: Apr. 1, 2020

(86) PCT No.: PCT/EP2020/059283
§ 371 (c)(1),
(2) Date: Sep. 28, 2022

(87) PCT Pub. No.: WO2021/197600
PCT Pub. Date: Oct. 7, 2021

(65) Prior Publication Data
US 2023/0145544 A1 May 11, 2023

(51) Int. Cl.
*G06F 21/16* (2013.01)
*G06N 3/08* (2023.01)

(52) U.S. Cl.
CPC .......... *G06F 21/16* (2013.01); *G06N 3/08* (2013.01)

(58) Field of Classification Search
CPC .......... G06F 11/3684; G06F 11/3688; G06F 21/577; G06F 8/71; G06F 8/36;
(Continued)

(56) References Cited

U.S. PATENT DOCUMENTS

| 7,565,549 B2 * | 7/2009 | Satterlee | G06F 21/53 713/193 |
| 8,250,375 B2 * | 8/2012 | Carpenter | G06F 21/73 380/284 |

(Continued)

FOREIGN PATENT DOCUMENTS

WO 2016043734 A1 3/2016

OTHER PUBLICATIONS

International Search Report and Written Opinion dated Sep. 21, 2020 for International Application No. PCT/EP2020/059283 filed Apr. 1, 2020; consisting of 25 pages.
(Continued)

*Primary Examiner* — Sharif E Ullah
(74) *Attorney, Agent, or Firm* — Weisberg I.P. Law, P.A.

(57) ABSTRACT

Training a neural network and embedding a watermark in the network to prove ownership. The network includes a plurality of trainable parameters associated with network nodes in which the plurality of trainable parameters is split into a first set of trainable parameters and a second set of trainable parameters. A first set of training samples is input to the network and the network is trained by iterating the first set of samples through the network to update the first set of parameters and hindering the second set of parameters to be updated during iteration of the first set of samples. A second set of samples is input and the watermark is embedded by iterating the second set of samples through the network to update the second set of parameters and hindering the first set of parameters to be updated during iteration of the second set of samples.

23 Claims, 3 Drawing Sheets

(58) Field of Classification Search
CPC ....... G06F 11/3612; G06F 2009/45591; G06F 11/3664; G06F 8/77; G06F 11/3692; G06F 8/72; G06F 21/60; G06F 21/52; G06F 21/56; G06F 21/16; H04L 63/1433; H04L 41/5054; H04L 43/50; H04L 12/40006; H04L 63/1416; G06N 3/0454
USPC ........ 713/150, 163, 176, 181; 726/2, 21, 36; 380/255, 264, 276
See application file for complete search history.

(56) References Cited

U.S. PATENT DOCUMENTS

| | | | | |
|---|---|---|---|---|
| 8,289,971 | B2* | 10/2012 | Furber | H04L 45/06 370/395.31 |
| 8,355,514 | B2* | 1/2013 | Rhoads | G07F 7/1016 380/252 |
| 8,433,582 | B2* | 4/2013 | Ramabadran | G10L 21/038 704/226 |
| 11,483,317 | B1* | 10/2022 | Bolignano | G06F 21/577 |
| 2003/0088778 | A1* | 5/2003 | Lindqvist | H04L 67/63 348/E7.071 |
| 2004/0042650 | A1* | 3/2004 | Ii | G06F 18/211 382/158 |
| 2007/0174633 | A1* | 7/2007 | Draper | G06V 40/1353 713/181 |
| 2015/0317496 | A1* | 11/2015 | Olmos | G06F 1/14 726/36 |
| 2016/0080250 | A1* | 3/2016 | Ramachandran | H04L 47/22 709/226 |
| 2017/0230391 | A1* | 8/2017 | Ferguson | G06N 7/01 |
| 2017/0318034 | A1* | 11/2017 | Holland | G06N 20/10 |
| 2019/0005387 | A1* | 1/2019 | Blayvas | G06N 3/045 |
| 2019/0050368 | A1* | 2/2019 | Chen | G06N 20/10 |
| 2019/0122096 | A1* | 4/2019 | Husain | G06F 11/3495 |
| 2019/0362232 | A1* | 11/2019 | Nagai | G06N 3/084 |
| 2020/0074581 | A1* | 3/2020 | Nemes | H04N 1/3232 |
| 2020/0366690 | A1* | 11/2020 | Cheng | G06N 3/08 |
| 2022/0141026 | A1* | 5/2022 | Smith | H04L 9/0891 713/181 |
| 2022/0313140 | A1* | 10/2022 | Atasoy | G16H 40/63 |

OTHER PUBLICATIONS

Srivastava, Nitish, et al.; Dropout: A Simple Way to Prevent Neural Networks from Overfitting; Journal of Machine Learning Research 15; pp. 1929-1958; Toronto, Ontario, Canada; Jun. 2014; consisting of 30 pages.
Barrow, E., et al.; Selective dropout for deep neural networks; Lecture notes in computer science; pp. 519-528; Oct. 16-21, 2016; Springer; Kyoto, Japan; consisting of 10 pages.
Le Merrer, Erwan, et al.; Adversarial frontier stitching for remote neural network watermarking; Aug. 7, 2019; consisting of 12 pages.
Uchida, Yusuke, et al.; Embedding Watermarks into Deep Neural Networks; Apr. 20, 2017; consisting of 10 pages.
Shokri, Reza, et al.; Membership Inference Attacks Against Machine Learning Models; 2017 IEEE Symposium on Security and Privacy; IEEE Computer Society; 2017; consisting of 16 pages.
Adi, Yossi, et al.; Turning Your Weakness Into a Strength: Watermarking Deep Neural Networks by Backdooring; Jun. 11, 2018; consisting of 17 pages.
Zhang, Jialong, et al.; Protecting Intellectual Property of Deep Neural Networks with Watermarking; In ASIA CCS '18: 2018 ACM Asia Conference on Computer and Communications Security; Jun. 4-8, 2018; Incheon, Republic of Korea; New York, NY, USA; consisting of 13 pages.
Rouhani, Bita Darvish, et al.; DeepSigns: An End-to-End Watermarking Framework for Protecting the Ownership of Deep Neural Networks; 2019; San Diego, California; consisting of 12 pages.
Nagai, Yuki, et al.; Digital Watermarking for Deep Neural Networks; Feb. 6, 2018; consisting of 14 pages.
Veeraprasit, S. et al.; Neural Network-Based Teeth Recognition Using Singular Value Decomposition and Color Histogram; Information Engineering and Computer Science (ICIECS); 2010 2nd International Conference on, IEEE, Piscataway, NJ, USA, Dec. 25, 2010; consisting of 4 pages.
Bulot, R. et al.; Explicit Knowledge and Neural Networks for Speech Recognition; ISCA Archive; First European Conference on Speech Communication and Technology (Eurospeech); Paris, France, Sep. 27-29, 1989; consisting of 4 pages.

\* cited by examiner

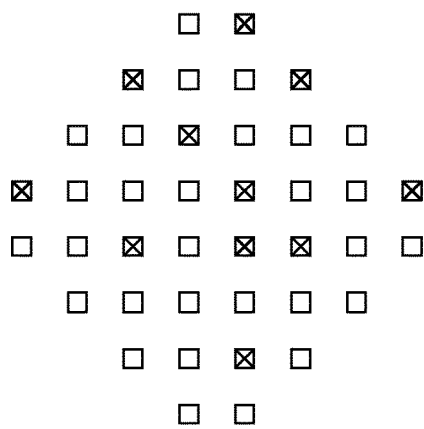
Fig.2A
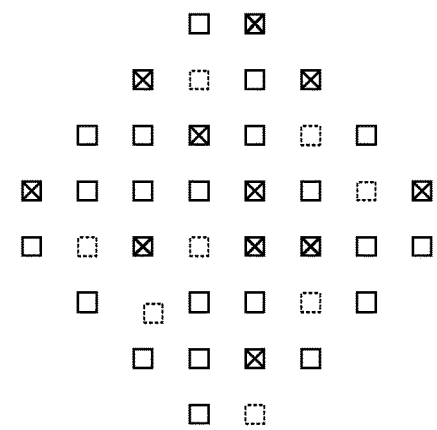
Fig.2B
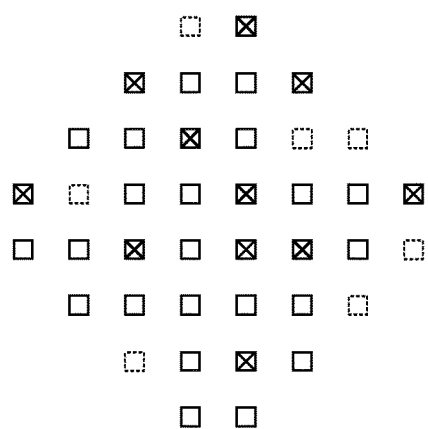
Fig.2C
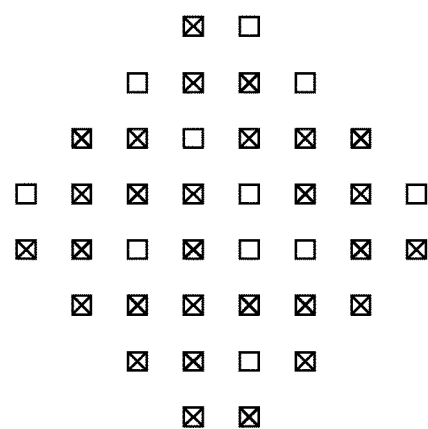
Fig.2D
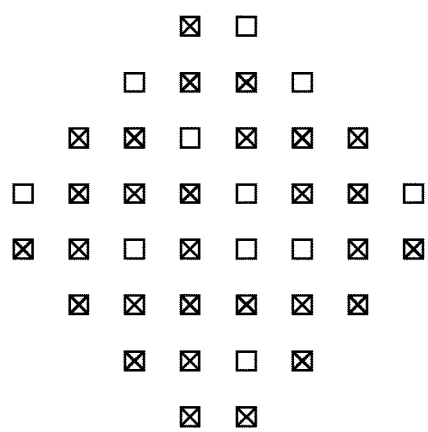
Fig.2E
Fig.2

NEURAL NETWORK WATERMARKING

CROSS-REFERENCE TO RELATED APPLICATION

This application is a Submission Under 35 U.S.C. § 371 for U.S. National Stage Patent Application of International Application Number: PCT/EP2020/059283, filed Apr. 1, 2020 entitled "NEURAL NETWORK WATERMARKING," the entirety of which is incorporated herein by reference.

TECHNICAL FIELD

The present invention relates generally to the field of neural networks. More particularly, it relates to neural network watermarking.

BACKGROUND

Digital watermarks are typically used to prove ownership of and track the source of intellectual properties such as images, videos, music, software, etc. A digital watermark is typically embedded in protected data without altering or corrupting the data excessively and in a way that makes it hard to remove the watermark or to create a copy of the protected data without the embedded watermark.

As neural networks have been in high demand for various applications lately, protection against theft and illicit use of neural networks is also becoming more important. A well trained neural network may e.g. be stolen and used as a base for other training. However, embedding watermarks into neural networks may potentially affect the overall learning capabilities of the network. Therefore, there is a need for alternative methods and apparatuses for embedding watermarks as well as extracting said watermarks from a neural network.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an apparatus is referred to herein, it is to be understood as a physical product. The physical product may comprise one or more parts, such as controlling circuitry in the form of one or more controllers, one or more processors, or the like.

It is an object of some embodiments to solve or mitigate, alleviate, or eliminate at least some of the above disadvantages and to provide methods and apparatuses for training a neural network and embedding a watermark in the neural-self learning network as well as for extracting an embedded watermark from a neural network.

According to a first aspect, this is achieved by a method for training a neural network and embedding a watermark in the neural network. The watermark is typically for being able to prove ownership and possibly for authenticating the neural network. The neural network comprises a plurality of trainable parameters associated with a number of network nodes. The method comprises splitting the plurality of trainable parameters into a first set of trainable parameters and a second set of trainable parameters and inputting a first set of training samples to the neural network.

In some embodiments, a trainable parameter may e.g. be at least one of a neural network weight, offset, bias or other updatable parameter used for training the neural network.

In some embodiments, the first set of trainable parameters may be arranged in a first subset of network nodes of the number of network nodes.

The method also comprises training the neural network by iterating the first set of training samples through the neural self learning network to update the first set of trainable parameters and hindering the second set of trainable parameters to be updated during iteration of the first set of training samples.

The method also comprises inputting a second set of training samples, to the neural network and embedding the watermark by iterating the second set of training samples through the neural network to update the second set of trainable parameters and hindering the first set of trainable parameters to be updated during iteration of the second set of training samples.

In some embodiments, the second set of trainable parameters may be arranged in a second subset of network nodes of the number of network nodes.

In some embodiments, the first set of trainable parameter and the second set of trainable parameters form parallel layers in the neural network and the method further comprises iterating the first set of training samples and the second set of training samples through the respective set of trainable parameters in sequence.

In some embodiments, the method further comprises choosing the second set of training samples to comprise a first number of training samples and choosing the second set of trainable parameters to comprise a second number of trainable parameters, wherein the first number is smaller than the second number.

In some embodiments, the first set of training samples comprises general training samples for training the neural network, and the second set of training samples comprises training samples for watermarking.

In some embodiments, the second set of training samples comprises training samples from the first set of training samples.

In some embodiments, the second set of training samples comprises training samples from the first set of training samples that have been miss-classified by the neural network during iteration of the first set of training samples.

In some embodiments, the second set of training samples comprises training samples unrelated to the first set of training samples.

In some embodiments, the second set of training samples comprises training samples formed by noise.

In some embodiments, the method further comprises training the neural network to associate the training samples for watermarking of the second set of training samples with an unexpected class.

In some embodiments, the method further comprises iterating the second set of training samples through the second set of trainable parameters until a classification confidence associated with the second set of training samples is above a confidence threshold.

A second aspect is a method for extracting a watermark embedded according to the first aspect in a neural network. The watermark is for proving ownership and possibly for authenticating the neural network and the neural network comprises a plurality of trainable parameters associated with a number of network nodes.

The method comprising inputting at least one key sample to the neural network, wherein the at least one key sample is associated with the embedded watermark.

The method also comprises evaluating an output from the neural network by performing at least one of determining that a confidence value associated with the output of the at least one key sample inputted to the neural network is above a confidence threshold and determining that a predetermined subset of network nodes of the number of network nodes are activated when the at least one key sample is inputted to the neural network.

A third aspect is a computer program product comprising a non-transitory computer readable medium. The non-transitory computer readable medium has stored thereon a computer program comprising program instructions. The computer program is configured to be loadable into a data-processing unit, comprising a processor and a memory associated with or integral to the data-processing unit. When loaded into the data-processing unit, the computer program is configured to be stored in the memory. The computer program, when loaded into and run by the processor, is configured to cause the execution of method steps according to any of the methods described in conjunction with the first and second aspects.

A fourth aspect is an apparatus for training a neural network and embedding a watermark in the neural network. The watermark is for proving ownership (and possibly for authenticating) of the neural network. The neural network comprises a plurality of trainable parameters associated with a number of network nodes. The apparatus comprises a controller configured to cause splitting of the plurality of trainable parameters into a first set of trainable parameters and a second set of trainable parameters, inputting of a first set of training samples to the neural network and training of the neural network by iteration of the first set of training samples through the neural self learning network to update the first set of trainable parameters and hindering the second set of trainable parameters to be updated during iteration of the first set of training samples.

The controller is also configured to cause inputting of a second set of training samples, to the neural network and embedding the watermark by iteration of the second set of training samples through the neural network to update the second set of trainable parameters and hindering the first set of trainable parameters to be updated during iteration of the second set of training samples.

A fifth aspect is an apparatus for extracting a watermark embedded according to the first aspect in a neural network. The watermark is for proving ownership of the neural network and the neural network comprises a plurality of trainable parameters associated with a number of network nodes. The apparatus comprising a controller configured to cause inputting of at least one key sample to the neural network, wherein the at least one key sample is associated with the embedded watermark. The controller is also configured to cause evaluation of an output from the neural network by causing performance of at least one of determination of that a confidence value associated with the output of the at least one key sample inputted to the neural network is above a confidence threshold and determination of that a predetermined subset of network nodes of the number of network nodes are activated when the at least one key sample is inputted to the neural network.

A sixth aspect is a computer comprising a neural network and the apparatus according to any of fourth and fifth aspects for training the neural network and embedding a water mark in the neural network and/or extracting an embedded watermark from the neural network.

In some embodiments, any of the above aspects may additionally have features identical with or corresponding to any of the various features as explained above for any of the other aspects.

An advantage of some embodiments is that a watermark in a neural network may be embedded without affecting the general training of the neural network.

Yet an advantage of some embodiments is that a watermark may be embedded with a high confidence value which simplifies extraction of the watermark.

Yet an advantage of some embodiments is that that an embedded watermark may be extracted even if the neural network has been retrained without the watermarking samples.

Yet an advantage with some embodiments is that non-complex extraction of an embedded watermark is enabled.

Yet an advantage with some embodiments is that any type of sample may be used for embedding a watermark into a neural network.

Yet an advantage with some embodiments is that a watermark sample does not have to be associated with an unexpected class for embedding the watermark.

Yet an advantage of some embodiments is that the samples used for embedding the watermark may be derived from general training samples which makes it more difficult for an unauthorized person to detect the watermark and thus remove it.

Yet an advantage of some embodiments is that a robust method for watermarking and training of a neural network is provided.

BRIEF DESCRIPTION OF THE DRAWINGS

Further objects, features and advantages will appear from the following detailed description of embodiments, with reference being made to the accompanying drawings, in which:

FIG. 2a-2e are a schematic drawings illustrating an example neural network topology according to some embodiments;

DETAILED DESCRIPTION

Figure 1:
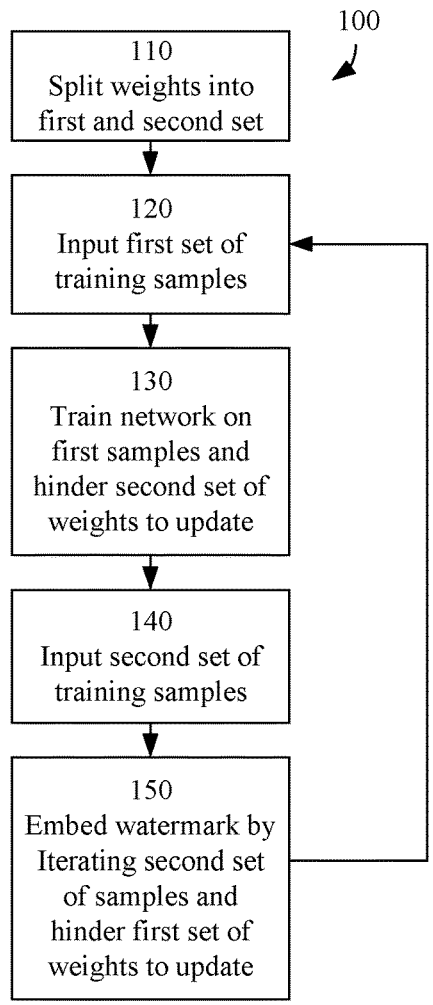
FIG. 1 is a flowchart illustrating example method steps according to some embodiments.

In the following, embodiments will be described where training of a neural network with robust watermark embedding is enabled.

A neural network is typically a network which is able to be trained based on what is input to the network. A neural network may e.g. be taught to recognize patterns or other objects in images. It may further be applied in machine learning and artificial intelligence.

In general, a neural network consists of a number of network nodes or neurons. Each node holds one or more trainable parameters. A trainable parameter may e.g. be a weight, an offset and possibly a bias value or other standardized updatable parameter associated with a neural network. A trainable parameter may be a network node comprising weights. A weight e.g. is the parameter within a neural network that transforms input data within the network's hidden layers. As an input enters the node, it gets multiplied by the weight value and the resulting output may e.g. be observed, or passed to the next layer in the neural network (e.g. by being summed with all other inputs multiplied with their respective weights, and the bias and then possibly sent through an activation function prior to sending this value to all connected nodes in the next layer).

Trainable parameters are typically learnable parameters inside the neural network. A teachable neural network may e.g. randomize (other strategies for initialization exists and are contemplated) trainable parameters before learning initially begins. As training continues, the parameters are adjusted toward the desired values (along the desired gradient of some loss function) and the correct output. The trainable parameters may differ in the extent of their influence upon the input data. E.g., bias represents how far off the predictions are from their intended value (i.e. how well the network is actually learning). Biases make up the difference between the function's output and its intended output. A low bias suggest that the network is making more assumptions about the form of the output, whereas a high bias value makes less assumptions about the form of the output. Weights, on the other hand, can be thought of as the strength of the connection. Weights typically affects the amount of influence a change in the input will have upon the output. A low weight value typically will have no or little change on the input, and alternatively a larger weight value will more significantly change the output.

In general when a neural network is trained, a set of training samples are input into the network and the trainable parameters (i.e. the value of the trainable parameters such as the value of the weights) are updated continuously with each iteration of the samples through the network. Hence the value of the trainable parameters that was initially input will typically not be the same when the network has gone through training. Various mechanism are available for facilitating robust and accurate training of the network.

One such mechanism is known as "drop out". Dropout is a mechanism in training of Neural Networks that have had great success as an ad hoc measure against overtraining-thereby producing more robust and generalizing networks. Dropout works by randomly cancelling a fraction of the weights at a layer during training to avoid overtraining by dependency on a few specific weights.

Neural networks are structured as a set of layers of activation weights. During training, weights are updated according to the gradient with respect to some loss function. If the weights are too many compared to the diversity and complexity of the training data, overtraining may occur. This means that the network is overly fit to the specifics of the training data, and that the performance is worse on samples not contained in the training data. Dropout may be used to reduce the risk of overtraining. As noted above, dropout works by randomly cancelling a portion of the weights in a layer during training and thus implicitly guiding the output of the training not to over train the weights towards specific samples.

As mentioned above, a well-trained neural network is a valuable asset which is liable for theft, and hence there are incitements for wanting to protect a neural network and embed e.g. a watermark into to the topology of the network which may be used for proving whether a neural network has been stolen or not.

Although there have been techniques proposed in the prior art to embed digital watermarks into neural networks, the area is still in its infancy and there are to this day no established solutions. The existing solutions for watermarking of neural network models can be divided into two categories, static and dynamic. Static methods embed one or more watermarks in the static content of the neural network (e.g. the trainable parameters, such as the weights) and to extract the watermark one needs to access the internal details of the network. Dynamic methods analyze the activations (e.g. internal activation maps of the trainable parameters or only the output class) when the model is used on particular key samples in order to determine if the model is watermarked.

It should be noted that the term "model" as used herein relates to a neural network. The terms model and neural network may be used interchangeably in this disclosure.

It should be noted that the terms "key sample" and "watermark sample" when referred to in this disclosure relates to a training sample associated with a watermark. The key sample may be used both for embedding the watermark (i.e. training the network with the key sample) and for extracting the watermark (i.e. inputting the key sample to the neural network for receiving a specific output associated with the watermark).

The term "general training samples" when referred to herein is taken to mean training samples used for training the network according to its intended function.

The existing dynamic prior art solutions mostly focus on adding specially chosen or crafted watermarking key samples to a given output class. The model is trained to give an unexpected output (e.g. a Watermark class) for a certain watermarking key sample and it would be very unlikely for another model trained on such a task to produce this output for the watermarking key sample.

With unexpected output it is meant that when a certain input is fed to a certain neural network it may be expected that the network will produce a certain output. E.g., if the network is for recognizing cats in images, an image comprising a cat will have an expected output of the neural network determining (with high probability) that the image is a cat.

The watermark class may however comprise an unexpected class. E.g. the neural network may have been trained such that some images (i.e. the key sample for the watermark of the network in this example) that normally would not be seen as cats will be rated as cats by the network. E.g. a watermark sample may be an image of a coffee machine, and network will return that this coffee machine is a cat due to the embedded watermark (it should be noted that images are just an example of what a neural network can classify. Other types of data may be classified and the embodiments described herein are applicable regardless of what type of data is being classified).

Detection of illicit usage could then be performed by checking the return from a suspect model with a number of watermarking key samples. In case all return classes is that of the watermark, then it is likely that the model is the same, in other words, that it has been stolen. How the key images/key data are chosen or crafted and how the model is fine-tuned to give the wanted (possibly unexpected) output for the key samples differ between proposed solutions in the prior art.

However, there are two potential problems with the existing solutions that the embodiments disclosed herein seek to solve or at least mitigate. Firstly, training a class with samples that are completely different from the target class (e.g. the target class is cats and the watermark sample is a coffee machine) tends to pollute the network model resulting in a decrease in accuracy for the model (i.e. the network is inhibited in its learning and predictions). This holds both for samples with unexpected class belonging and crafted samples that is not similar to the rest of the training data. Some of the embodiments described herein may limit this problem by isolating the trainable parameters that are active for the key samples. These trainable parameters are trained in a separate burn-in training in which the rest of the trainable parameters are not updated so much or even at all. This technique of watermarking provides high accuracy of the watermarked model compared to prior art models. With high accuracy it is meant that the neural network performs well on general samples as well as on watermark samples, since the risk of polluting the general model with the watermarking is reduced.

Secondly, the more different the watermark key sample is from the expected samples of the task, the easier it would be for a model thief/attacker to detect that a watermark verification is being performed and thus the model thief could avoid returning the watermark class for such samples. Some of the embodiments disclosed herein enable good performance using key samples selected from the original training data were the class of the key sample is changed to something unexpected to enable detection of the watermarked model by inspecting the output of the key samples. However, by deriving the watermark samples from the general training samples it makes it more difficult for the thief/attacker to find the watermark samples.

By isolating the trainable parameters related to the watermark samples, a more fine-grained control of the watermarking is obtained and watermark key samples that are more difficult to be detected by an attacker can be stored in the network without compromising accuracy of the network.

Some of the embodiments described herein propose a technical solution to watermark machine learning models (the terms machine learning models and neural network and or model may be used interchangeably in this disclosure). In the training process the trainable parameters (e.g. the weights or the nodes associated with the weights) of the neural network are split into two sets and control is further put on which trainable parameters that will be updated during a round of the training process. The training process is also split in two, with different training data in each part. This makes it possible to have some trainable parameters that are over trained to give a distinct response only for a small number of key samples, while other trainable parameters generalize the classification problem based on the entire training data set excluding the samples used for watermarking. The solution can be used to remember/burn-in a number of watermarking key samples without affecting the general precision of the neural network. For example, by using watermarking key samples with an unexpected class at training, it can be determined if a model that is suspected to be stolen has been trained with these key samples by inspecting the output/classification of the key samples for the examined model.

It should also be noted that the term iteration when used in this disclosure is generally to be understood as something being repeated. In terms of neural network, iterating the training samples through the trainable parameters means that the network is trained by running the same samples through the entire network and/or its different layers several times in order to update and trainable parameters and thus train the network according to procedures that are standard for a neural network and commonly known by a skilled person having knowledge of the field of neural networking.

FIG. 1 illustrates an example method 100 according to some embodiments.

The method 100 may be for training a neural network and embedding a watermark in the neural network. The watermark is for proving ownership of and possibly authenticating the neural network. The neural network comprises a plurality of trainable parameters associated with a number of network nodes.

The trainable parameters may e.g. be at least one of a weight, offset and bias of the neural network. The trainable parameter may be a network node (of the number of nodes) of the neural network.

The method 100 starts in step 110 with splitting the plurality of trainable parameters into a first set of trainable parameters and a second set of trainable parameters. Then in step 120 the method continues with inputting a first set of training samples to the neural network and in step 130 with training the neural network by iterating the first set of training samples through the neural self learning network to update the first set of trainable parameters and hindering the second set of trainable parameters to be updated during iteration of the first set of training samples.

Hence, for the first set of samples, which may e.g. comprise general training data chosen based on the intended purpose of the network training is made in accordance with general and standard training mechanisms for training neural networks. However, some of the trainable parameters are locked, i.e. they are stopped from being updated during training and are hence set in value for as long as general training data (i.e. samples from the first set of training samples) is input into the neural network.

The method then continues in step 140 with inputting a second set of training samples, to the neural network. The second set of training samples may e.g. be training samples that are associated with watermarking. The second set of training samples may e.g. be the watermark that is to be embedded. The second set of samples may thus comprise one or more key samples.

In some embodiment the first set of trainable parameters may be comprised in a first set of network nodes (of the number of network nodes), and the second set of parameter may be comprised in a second set of network nodes (of the number of network nodes). The first set of network nodes may be different from the second set of network nodes. Hence, the method may alternatively or additionally comprise splitting the number of network nodes into a first subset of network nodes and a second subset of network nodes. The second subset of network nodes may in some embodiments be reserved for training of watermark key samples.

How and in what sizes the various sets are chosen is arbitrary and may differ depending on what the intended purpose of the neural network is and or what type of samples that are going to be input. In general training of a network, overfitting of training samples may e.g. be avoided by keeping the number of trainable parameters limited compared to the number of samples Whereas when a watermark is to be embedded it is advantageous to choose the ratio between the trainable parameters and the watermark samples such that the number of trainable parameters exceed the number of samples.

It should be noted that the number of parameters should not be too great for the training set that is attempted to be modelled, but how it corresponds to the number of samples in the training set is unknown and typically highly depends on the dimensionality as well as variance of the training samples.

Then in step 150 the method 100 continues with embedding the watermark by iterating the second set of training samples through the neural network to update the second set of trainable parameters and hindering the first set of trainable parameters to be updated during iteration of the second set of training samples. Thus, when watermarking samples (i.e. samples that are intended for watermarking such as key samples and which may be different from the first set of training samples) are run through the network, only the trainable parameters associated with watermarking (i.e. the trainable parameters of the second set) are allowed to update. Hence the second set of trainable parameters will only update in relation to samples from the second set of samples.

This leads to a neural network that has been trained to recognize two types of samples and act slightly differently depending on what type of sample that is inputted.

E.g. if the inputted data/samples relate to general samples, then the network will operate and train according to general training principles for a neural network since the trainable parameters both of the first and second set of training parameters will be active but only the first set will be updated during run through of the inputted data. If the inputted data on the other hand relates to the watermark (i.e. the input data are key samples for the watermark, key samples may e.g. be samples from the second set of training samples), both set of training parameters will be active but the network will only be allowed to update the second set of trainable parameters for training the network leading to over training the trainable parameter of the second set to the key samples.

The method 100 builds on specifying which trainable parameters (and/or network nodes) should be activated for training depending on the training set. By reserving some trainable parameters (and/or a subset of network nodes) for the watermark key samples, meaning that they will not be updated during training with the normal training set, and then only allowing updates to these trainable parameters during training with the watermark key samples, the network can be forced to "remember" the watermark key samples by overtraining with these. This overtraining will then only affect the reserved set of trainable parameters related to the key samples. The result is a network with some trainable parameters to "remember" the key samples and others that generalize the classification problem. This way it is possible to produce high confidence scores/values for a watermark class of the watermark key samples without impacting the general performance.

In some embodiments, the first set of trainable parameters and the second set of trainable parameters form parallel layers in the neural network and the method may further comprise iterating the first set of training samples and the second set of training samples through the sets of trainable parameters in sequence. Training the network on the first set of samples and then on the second set of samples may be performed in sequence iteratively several times (as is illustrated by the arrow leading from step 150 and back to step 120 of the method 100). This will lead to robust training of the neural network as well as robust embedding of the watermark.

An advantage with the above embodiments is that that it is typically not possible to determine based on the topology of the trained neural network which trainable parameters are reserved for watermarking and which are used for function. All trainable parameters are active during general training (i.e. all samples are fed through all nodes in the network), but only some are allowed to update. This may make it difficult for a potential thief/attacker to either find and/or remove the watermark from the trained network.

Hence, it is almost (if not completely) impossible to see by inspecting the values of the trainable parameters how each parameter has been trained (and thus which correspond to watermark samples) unless knowledge of the actual training has been retained. This makes it hard for an unauthorized person to find the trainable parameters of the second set in the trained network.

Furthermore, even if they were accidentally found, it may not be trivial to remove them as the network has been optimized in presence of these trainable parameters (e.g. the weights of the second set have been updated with regards to the weights of the first set fixed to their respective values—and not as if they were not present), and removing them in order to erase the watermark may hence have a negative impact on the overall function and performance of the neural network.

Furthermore, in some embodiments the method 100 may further comprise choosing the second set of training samples to comprise a first number of training samples and choosing the second set of trainable parameters to comprise a second number of trainable parameters, wherein the first number is smaller than the second number.

In some embodiments, the method 100 may further comprise choosing the second set of training samples such that a predictive capacity of the second set of training parameters exceeds an amount of training samples in the second set of training samples.

If the sample subset is small compared to the number/predictive capacity of specified trainable parameters, this can be used to burn-in or remember the samples (providing a very high confidence score/value for the associated class) during testing. One application of this is watermarking of a neural network model. By selecting a set of samples to remember and associating some specific trainable parameters in key layers of the neural network, it is possible to ensure that the neural network gains very high confidence in classifying this set of samples correctly without loss of accuracy in the general case.

E.g. by training a small number of samples in a large number of trainable parameters a mechanism commonly known as overfitting (or over-train or burn-in, the terms may be used interchangeably) is achieved. In terms of neural networks, overfitting means that the model predicts accurately at a certain sample which it has trained on, but performs less accurately on samples other than the training samples. Hence, for the general function of a neural network, overfitting is not desirable since it would mean that the model only performs well on the training samples, but not on other samples. However, when watermarking, this very feature may be beneficial since the model can be trained to provide a singular output for a singular sample, and it may be very difficult for a potential thief to determine which exact sample is the watermark sample (and hence remove the watermark or rewire the network to give another output).

Furthermore, the watermarking key samples can be selected from the training data or crafted in different ways. E.g. training samples that have activations that are located in rarely explored regions may be used. Or, watermarked samples from the training set may be used (e.g. by adding text to an image), new samples unrelated to the classification task may be used, or samples based on noise may be used. The method 100 is e.g. agnostic to the way the watermark samples are chosen.

Hence, in some embodiments, the first set of training samples comprises general training samples for training the neural network, and the second set of training samples comprises training samples for watermarking.

In some embodiments, the second set of training samples comprises training samples from the first set of training samples.

In some embodiments, the second set of training samples comprises training samples from the first set of training samples that have been misclassified by the neural network during iteration of the first set of training samples. During general training, some samples may e.g. receive an unexpected result (i.e. misclassification) due to do values of the trainable parameters and the offset, and the neural network will during training reduce these misclassifications.

However, these samples may be used for watermarking since it may be more difficult for a potential thief to find the watermarking samples if they form part of the original training set.

In some embodiments, the method 100 may further comprise training the neural network to associate the training samples for watermarking of the second set of training samples with an unexpected class.

In some embodiments, the second set of training samples comprises training samples unrelated to the first set of training samples. The training samples may e.g. be different and relate to different classes etc.

In some embodiments, the second set of training samples comprises training samples formed by noise. Noise samples may be derived from the first set of training samples, or they may be generated unrelated to the first set of training samples.

Many solutions according to prior art regard an examined model to be watermarked if the output of the key sample is the unexpected class, as it is unlikely that a different model would make the same incorrect classifications.

However, if not only the classification but also the confidence for the classification is available from the examined model it is possible according to some of the embodiments described herein to burn-in/over train the key samples so that the confidence in the classification for these are particularly high. The key samples can then be set to the true class in the fine tuning (instead of an unexpected class) of the network, which may benefit the accuracy of the final model.

In such case the model is regarded as watermarked if most of the key samples have classification confidence above a certain threshold. The watermark extraction could be viewed as a membership inference attack, where the output of the examined model is used to determine whether a particular (watermarking key) sample was used in the training or not. The particular way the watermarking key samples may be burned into the model makes it easier to succeed in such an attack for these key samples, and hence makes the watermarking extraction more successful.

Thus, in some embodiments the method 100 may further comprise iterating the second set of training samples through the second set of trainable parameters until a classification confidence associated with the second set of training samples is above a confidence threshold. Different values of the confidence threshold are contemplated to fall within the scope of the embodiments herein. It should be noted that the value of the confidence value may vary based on the settings of the neural network and the intended purpose of the neural network. The method steps of the method 100 may be repeated at least until a desired confidence value of the output associated with the second set of training samples has been reached. More information on the confidence threshold is given in conjunction with FIG. 3 further below.

Some of the embodiments described herein enable explicit reservation of trainable parameters that should only be updated depending on the dataset. A selection of training data can be associated with trainable parameters such that those trainable parameters only are updated for that selection of data during training.

According to some embodiments, a first step is to decide the network architecture and the trainable parameters that should be reserved for watermarking. After that the model is trained conventionally with the reserved trainable parameters locked such that they are not updated. After this first training the reserved trainable parameters will remain as their initial values. After this, the set of watermark samples is chosen. In some embodiments, the Neural Network created in the first step can be used to guide this selection process in order to select samples that are particularly unlikely to be classified correctly with an arbitrary network trained for the same task. In some embodiments, when the watermark samples have been selected, a new augmented dataset may be created that is a blend of the original training set and the watermarked samples (e.g. a blend of the first and second set of training samples as described above). Then training proceeds with the new set of training samples but this time instead locking the trainable parameters that are not reserved for watermarking-implying that only the reserved trainable parameters for watermarking will be updated during this process. This process can also be iterated so that new steps of training with general trainable parameters and reserved trainable parameters can be executed consecutively.

Some reference has been made to the mechanism of drop out. In some embodiments, if drop out is applied when training the neural network, the method may comprise hindering or blocking the trainable parameters (such as e.g. the weights) comprised in the second set of trainable parameters from dropping out during training (i.e. during iteration of the second set of samples through the neural network for updating the second set of trainable parameters). This may further enhance the overfitting (or burn in/over train) effect of the samples comprised in the second set of samples in relation to the second set of trainable parameters. Similarly, other standard regularization methods typically used when training neural networks may be hindered from being applied to the second set of trainable parameters when training the neural network on the second set of samples (in order to burn in the watermark).

FIG. 2 illustrates a schematic overview of a neural network according to some embodiments. The neural network may e.g. be the neural network being trained by the method as described in conjunction with FIG. 1.

For simplicity, the FIG. 2 illustrates a very simplified network where only the trainable parameters are illustrated as a number of squares. In FIG. 2A the squares marked by x are trainable parameters reserved to the second set of trainable parameters, and white squares are trainable parameters reserved to the first set of trainable parameters. The squares may e.g. be one or more of entire nodes, separate weights, offsets, biases or other suitable trainable parameter etc. In FIG. 2, drop out is applied as regularization method, however this is just an example, other regularization methods may be applied as well when performing the methods according to the embodiments described herein. FIGS. 2B and 2C illustrates how the network may drop out trainable parameters during training with the first set of samples. Trainable parameters that have been dropped out are marked with a dotted line. Note that no trainable parameter comprised in the second set is allowed to drop out. Furthermore, the trainable parameters of the second set is not allowed to update when training with the first set of samples.

In FIG. 2D, the second set of sample has been input, and now the first set of trainable parameters are not allowed to update, and are thus marked by an X, whereas the second set of trainable parameters (now clear) are allowed to update (in some embodiments, without drop out if such mechanism is employed).

FIG. 2E is identical to FIG. 2D in order to illustrate that the topology of the network remains the same during training with the second set of training samples in order to embed the watermark by over training.

All samples are run through all trainable parameters for all training iterations, however it is controlled which trainable parameters that are allowed to update based on the input sample.

The embodiments described herein for embedding a watermark also enables easy extraction of said watermark.

Since e.g. a set of trainable parameters is reserved for watermark embedding, whenever a key sample is input into the neural network the reserved set of trainable parameters will contribute to the activation of the network nodes associated with the set of reserved trainable parameters and comprised in the neural network. The activation of the network nodes corresponding to the reserved set will only happen when specific samples are input (i.e. the key samples relating to the watermark, and which samples were used for embedding the watermark). Hence, by analysing what trainable parameters (e.g. what subset of network nodes) contribute most to activation when one or more key samples are input it may be deduced if the model has a specific watermark embedded, and the neural network can thus be identified.

Hence, an owner which has knowledge of what samples were used for watermarking and further which trainable parameters (and/or network nodes) were reserved for embedding the watermark, can input the watermark samples into a suspected stolen network and analyse which nodes of the network activates in response to the key samples.

According to some embodiments, when training the neural network and embedding the watermark, whole nodes (i.e. all the trainable parameters associated with that node) may be reserved for either the general training samples or the watermark samples. By reserving the whole node, the node activation when inputting a key sample will typically be much higher compared to when general samples are input.

Typically, there is one activation function per node and the input to this activation function are the weights*input (which is the output from previous layers nodes—or activation functions)+bias. Hence, the trainable parameters (and/or nodes) reserved for watermarking contribute to the input of the activation function in the node of the next layer—thus making it produce a value not close to 0. If the node were to produce a value close to 0, the node is seen as being un-activated. (Hence, the method 100 may as elaborated on above comprise splitting the network nodes into subsets, where at least one subset is used for general training of the network and at least one other subset is used for embedding the watermark).

Furthermore, the burn in of the watermark samples may also results in that the key samples when run through the neural network will be output with an unusually high confidence value, which would be highly unlikely unless the specific burn in for those key samples had been made when training the network. Thus by analysing the confidence value associated with the outputted samples, the watermark may be extracted and the network identified.

Hence, the extraction method may differ depending on what information is available at extraction time. In the first case there may be access to the entire model and internals (e.g. the activations of certain nodes comprising trainable parameters having been overfit on the key samples) of the neural network can be analysed. In the second case there may only be access to the output of the model of key samples (e.g. as a classification or as the confidence for each class).

Figure 3:
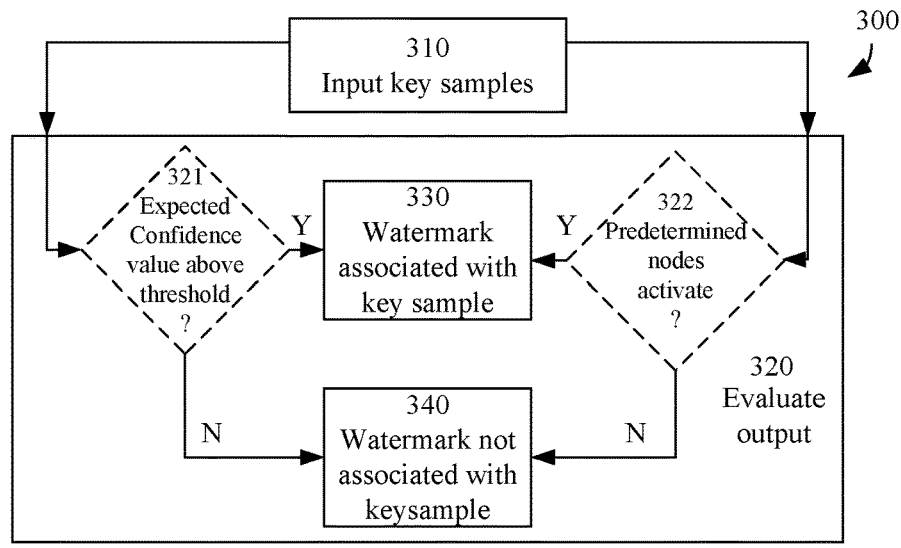
FIG. 3 is a flowchart illustrating example method steps according to some embodiments.

FIG. 3 illustrates an example method 300 according to some embodiments. The method 300 may e.g. be for extracting a watermark embedded according to the method 100 described in conjunction with FIG. 1 in a neural network (e.g. the network according to FIG. 2). The watermark is for proving ownership of the neural network and the neural network comprises a plurality of trainable parameters associated with a number of network nodes.

The method may start in step 310 with inputting at least one key sample to the neural network, wherein the at least one key sample is associated with the embedded watermark. The at least one key sample may e.g. be a sample comprised in the second set of training samples described in conjunction with FIG. 1.

The method may then comprise in step 320 evaluating an output from the neural network by performing at least one of the steps 321 and 322.

In method step 321 the method comprises determining that a confidence value associated with the output of the at least one key sample inputted to the neural network is above a confidence threshold. When it is determined that the output of the at least one key sample is above a confidence threshold (Y-path out of 321) the method may continue in 330 where it may be determined that the watermark is associated with the key sample. The watermark is thus extracted. When it is determined that the output of the at least one key sample is below the confidence threshold (N-path out of 321) the method may continue in step 340 where it may be determined that the key sample is not associated with the watermark. Extraction of the watermark has thus failed.

The confidence threshold may e.g. be a value that is decided when burning in the watermark and which may typically exceed the general confidence in the classification of the key samples for a network that has not been watermarked by the burn-in procedure.

The confidence value is the actual output that corresponds to each class modelled by the neural network, and may hence relate to a single evaluated sample. Accuracy generally relates to the total number of correctly classified samples.

In an example of a neural network trained to classify images of vehicles, the confidence value is the output of the neural network for an input image, where the output has one value for every vehicle that can be classified by the network. In most instances of classification networks the outputs will sum to 1 and a value close to 1 therefore indicates that the network has high confidence in its prediction. Accuracy for this example would be the number of times the highest confidence score corresponds to the correct label for a number of input vehicle images.

Training with the training samples of the second set may then be done until the confidence value of the output associated with the input training samples (or at least the key samples associated with the watermark) of the second set reaches or surpass the confidence threshold. Hence in an example where the confidence in the classification of the key samples of a neural network that has not been watermarked is around 20%, the confidence associated with the watermark samples may be burned in to be in a range of e.g. 80-100% by using the methods described herein. Thus the confidence threshold may be set based on the classification confidence of the key samples for a neural network that has not been watermarked by the burn in process. The owner of the network will typically have knowledge of what confidence value, or range of confidence value that is expected of the output associated with the key samples for watermarked and non-watermarked networks. Hence the confidence threshold may be predetermined (as it may have been set when the network was trained). The confidence threshold may thus vary based on the knowledge of the owner and the specific neural network which is suspected of being stolen (i.e. what confidence threshold was set during training of the network and embedding the watermark).

E.g. the watermark may have been embedded with a confidence value for the output of the key samples being 90%. However, a potential attacker/thief may have tried to retrain the network or reorder some of the nodes/trainable parameters which may lead to that the confidence value for the watermark may have deteriorated somewhat. The embodiments described herein may however still result in that the confidence value associated with the output of key samples is close to the original confidence value. A value close to 90% may e.g. be 80-100%. Hence a close value may be in the range of 10 percentage.

Furthermore, in some embodiments, a ratio of all inputted key samples having been given the correct class by the neural network is compared to the total number of inputted key samples. When it is determined that the ratio is above a ratio threshold, it may be determined that the watermark has been extracted. Hence, the watermark may be extracted based on a single key sample, and/or it may be extracted based on several inputted key samples. If several key samples has an expected classification accuracy, it may be deduced that the probability that the watermark key samples have been burned-in/embedded in the model is high.

In method step 322 the method may comprise determining that a predetermined subset of network nodes of the number of network nodes are activated when the at least one key sample is inputted to the neural network. When it is determined that the predetermined subset of network nodes of the number for network nodes are activated when the at least one key sample is inputted to the neural network (Y-path out of 322) the method continues to step 330 where it may be determined that the water mark is associated with the key sample. The watermark is thus extracted. When in step 321 it is determined that the predetermined subset of network nodes of the number of network nodes does not activate when the at least one key sample is input to the neural network (N-path out of 322) the method may continue in step 340 where it may be determined that the key sample is not associated with the watermark. Extraction of the watermark has thus failed.

As noted above, an owner of a suspected stolen network may typically have knowledge of which nodes were reserved for embedding the watermark, and will hence know which subset of nodes that should activate when the key samples are inputted to the neural network. It may thus be determined by someone having knowledge of which nodes were reserved for embedding the watermark whether a neural network is a stolen model or not by analysing the activation map of the neural network.

E.g. with a limited set of watermark samples, the activations could even be recorded to get a fingerprint of activations for each watermark after training is complete. Hence the method 100 described above may comprise determining a fingerprint of the watermark by recording an activation of the network nodes (and/or trainable parameters of the second set) associated with inputting training samples for watermarking of the second set of training samples.

The method 300 may thus in some embodiments, alternatively or additionally comprise extracting the watermark by inputting at least one key sample and comparing the activation of the network nodes to an activation fingerprint associated with the at least one key sample. The watermark is determined to be extracted if the activation fingerprint associated with the at least one key sample matches the activation of the network nodes when the at least one key sample is input to the neural network.

In order to increase the certainty that a network has a particular watermark embedded, several corresponding key samples may be used in the watermark extraction phase. If the number of key samples that are associated with the watermark according to the test methods described above exceeds a threshold, the network may be regarded to be watermarked.

Figure 4:
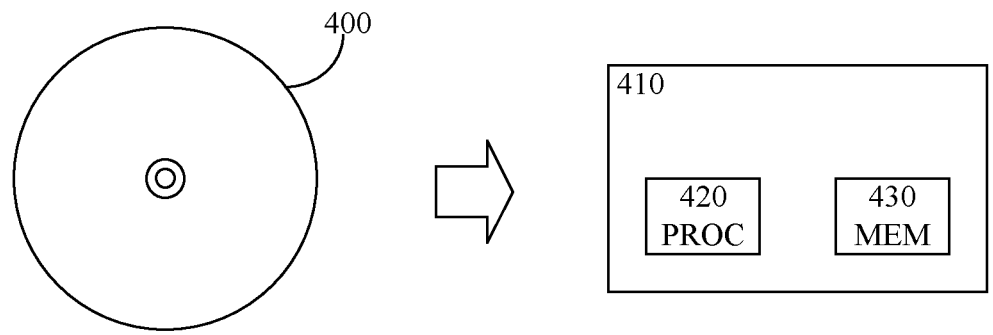
FIG. 4 is schematic drawing illustrating a computer program product according to some embodiments.

FIG. 4 illustrates a computer program product 400 comprising a non-transitory computer readable medium according to some embodiments. The non-transitory computer readable medium has stored thereon a computer program comprising program instructions. The computer program 400 is configured to be loadable into a data-processing unit 410, comprising a processor, PROC, 420 and a memory, MEM, 430 associated with or integral to the data-processing unit 410. When loaded into the data-processing unit 410, the computer program is configured to be stored in the memory 430. The computer program, when loaded into and run by the processor 420 is configured to cause the execution of method steps according to any of the methods described in conjunction with the FIGS. 1 and 3.

Figure 5:
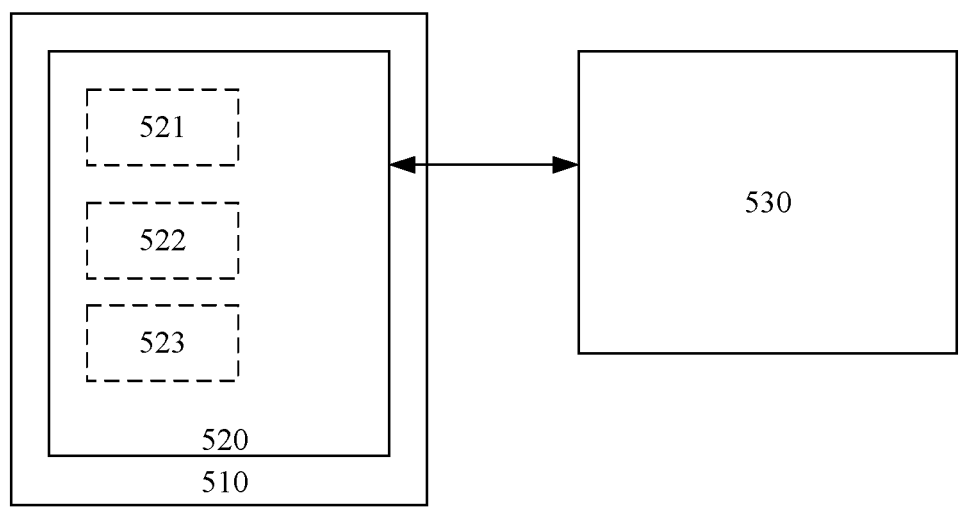
FIG. 5 is a block diagram illustrating an example apparatus according to some embodiments.

FIG. 5 illustrates an apparatus 510 for training a neural network 530 and embedding a watermark in the neural network 520. The apparatus 500 may e.g. be configured to carry out any of the methods and embodiments described in conjunction with the FIGS. 1-3 (any of the embodiments described in conjunction with FIGS. 1-4 are hence applicable on the embodiments described for the apparatus 500). The apparatus 510 may further be implemented by means of the computer program product described in conjunction with FIG. 4. The neural network 530 may be hosted or otherwise connected to the apparatus 510. In some embodiments, the neural network may be hosted by a machine (comprising some form of a computer and/or processor for running the algorithms which form the neural network) and the apparatus may be connected to the machine in order to train, embed watermarks and/or extract watermarks from the neural network.

The watermark is e.g. for proving ownership of and possibly for authenticating the neural network. The neural network comprises a plurality of trainable parameters associated with a number of network nodes. The apparatus comprises a controller (e.g. controlling circuitry and/or a controlling module) 520. The controller 520 is configured to cause splitting of the plurality of trainable parameters into a first set of trainable parameters and a second set of trainable parameters. The controller 520 is also configured to cause training of the neural network by inputting of a first set of training samples to the neural network and cause iteration of the first set of training samples through the neural network to update the first set of trainable parameters and hindering the second set of trainable parameters to be updated during iteration of the first set of training samples.

The controller is also configured to cause inputting of a second set of training samples, to the neural network and embedding of the watermark by iteration of the second set of training samples through the neural network to update the second set of trainable parameters and hindering the first set of trainable parameters to be updated during iteration of the second set of training samples.

The controller 520 may in some embodiments comprise additional components for causing some of the above or below mentioned actions. The controller may e.g. comprise a trainable parameter module 521 for keeping track on the trainable parameters. The controller 520 may e.g. cause the trainable parameter module 521 to split the plurality of trainable parameters into two sets.

Similarly, the controller 520 may in some embodiments comprise a sample module 522 for keeping track of the inputted samples. The controller 520 may e.g. cause the sample module 522 to input both the first and second set of training samples to the neural network 530. The sample 522 module may also be configured to generate the samples and/or keep track of the output associated with the samples when they have been processed by the neural network.

In some embodiments, the first set of trainable parameters and the second set of trainable parameters form parallel layers in the neural network. The controller 520 is further configured to cause iteration of the first set of training samples and the second set of training samples through the respective set of trainable parameters in sequence. The controller 520 may e.g. cause the trainable parameter module 521 and the samples module 522 to interact with the neural network 530. The trainable parameter module 521 may e.g. determine which trainable parameters of the neural network should be updated based on the split set of trainable parameters and what samples are input and configure the neural network accordingly. The neural network, samples and trainable parameters may then be monitored during training.

In some embodiments, the controller 520 is further configured to cause (e.g. by causing the sample module 522 to choose) choosing of the second set of training samples to comprise a first number of training samples and choosing of the second set of trainable parameters to comprise a second number of trainable parameters (e.g. by causing the trainable parameter module 521 to choose), wherein the first number is smaller than the second number.

How and what sizes the various sets are chosen is arbitrary and may differ depending on what the intended purpose of the neural network is and or what type of samples that are going to be input. In general training of a network, overfitting of training samples may be avoided by keeping the number of trainable parameters limited compared to the number of samples. Whereas when a watermark is to be embedded, overfitting may be preferable and it may be advantageous to choose the ratio between the trainable parameters and the watermark samples such that the number of trainable parameters exceed the number of samples.

In some embodiments, the first set of training samples comprises general training samples for training the neural network, and the second set of training samples comprises training samples for watermarking. As noted above, the controller 520 may cause the sample module 522 to manage and monitor the samples.

In some embodiments, the second set of training samples comprises training samples from the first set of training samples. The second set of training samples may e.g. be derived from the first set of training samples in order to better hide the watermark in the neural network.

E.g., in some embodiments, the second set of training samples comprises training samples from the first set of training samples that have been misclassified by the neural network during iteration of the first set of training samples.

In some embodiments, the controller 520 is further configured to cause training of the neural network to associate the training samples for watermarking of the second set of training samples with an unexpected class.

In some embodiments, the second set of training samples comprises training samples unrelated to the first set of training samples. The second set of training samples may e.g. be of a completely different class than the first set of training samples. The first set of training samples may e.g. relate to animals, whereas the second set of training samples relates to house appliances. When embedding the watermark, the neural network may be trained to miss-classify the second set of training samples. E.g. when a sample comprising a coffee machine is input to the neural network trained to recognize animals, it may output the coffee machine sample as being a monkey with high probability (i.e. high confidence value). The training samples of the second set may thus be misclassified in order to identify a watermark.

In some embodiments, the second set of training samples comprises training samples formed by noise. The samples used for watermarking may e.g. be more difficult to find and run through the neural network by a potential thief if the key samples (i.e. the samples of the second set of training samples) are constructed from noise rather than from coherent data.

In some embodiments the controller 520 is further configured to cause iteration of the second set of training samples through the second set of trainable parameters until a classification confidence associated with the second set of training samples is above a confidence threshold.

The apparatus 510 described above may also be used to extract a watermark from a neural network 530. The watermark may e.g. have been embedded in a neural network 530 according to the embodiments and methods described above in conjunction with the previous FIGS. 1-3 by the apparatus 510 (or by another similar apparatus suitable for executing software and computer implemented programs relating to neural networks and machine learning).

Similarly, the apparatus used for embedding a watermark does not have to be the same as the apparatus used for extracting the watermark. E.g. one processor and/or computer may be used for training the neural network, whereas a different one is used for extracting watermarks (since training of the network may be done at one site, and extracting the watermark may be done at another). The apparatus should be suitable for running and executing software associated with neural networks.

The watermark is for proving ownership (and possibly for authenticating) of the neural network. The neural network 530 comprises a plurality of trainable parameters associated with a number of network nodes. The apparatus 510 comprises a controller 520 configured to cause inputting of at least one key sample to the neural network 530. The at least one key sample is associated with the embedded watermark.

The at least one key sample may e.g. be one or more samples from the second set of samples described in conjunction with any of the above figures, and or the second set of samples used for embedding the watermark.

The controller 520 may further be configured to cause evaluation of an output from the neural network. The controller may in some embodiments comprise an evaluating module 523 configured to evaluate the output of the inputted samples in order to perform extraction of an embedded watermark.

The controller 520 may e.g. be configured to cause the evaluation by performing at least one of determination of that a confidence value associated with the output of the at least one key sample inputted to the neural network is above a confidence threshold; and determination of that a predetermined subset of network nodes of the number of network nodes are activated when the at least one key sample is inputted to the neural network.

The controller 520 may e.g. be configured to cause e.g. the evaluating module 523 to cause any of the above steps according to the method 300 described in conjunction with FIG. 3.

As noted, the apparatus 510 may be comprised in a computer and/or computer program product (e.g. as described in conjunction with FIG. 4). Hence some embodiments relates to a computer comprising a neural network and the apparatus according to FIG. 5 for training the neural network and embedding a watermark in the neural network and/or extracting an embedded watermark from the neural network.

With the embodiments described herein, the specifics of "remembering" the set of watermark key samples is focused on a specific set of trainable parameters in the network. This separation of trainable parameters enables doing the remembering of the watermark without impacting the rest of the network. E.g., when embedding the watermark it may be desirable to associate key samples with an unexpected class, however this association may affect the rest of the neural network and "bleed over" to the training of the samples to be associated with an expected class and thus reduce the overall accuracy leading to that the neural network does not perform as well as it has potential to. Furthermore, it is easier to ensure that any given sample is memorized. It also makes it possible to "burn in" any training sample as a watermark key sample—and that all of these samples may have a very high confidence since they are "burnt in" to the model. Since the classification confidence of such watermark key samples may be high for a watermarked neural network compared to a non-watermarked neural network (e.g. more than 60 percentages higher), it is possible to conduct illicit usage detection without using an unexpected watermark class, but instead verifying by detection of the unexpectedly high confidence values, which enables higher general accuracy of the neural network than what is achieved by prior art solutions due to the risk of contaminating the network when adding key samples of different type or with unexpected output to the training data.

For example, watermarking a network using embedding technique described herein and selecting misclassified samples as watermarking key samples has the potential to result in a trained neural network having an accuracy for the output of e.g. 98.70% (the number is just an example, other percentages are contemplated), which accuracy may be unaffected or even improved after embedding a watermark according to the embodiments described herein.

However, it should be noted that the accuracy of the results typically depend on the test sets (samples) and the architecture of the neural network. The above number should hence be seen as an example of accuracy which the described embodiments have been able to achieve. Other values are possible and may depend on the intended purpose of the neural network as well as the content of the training samples being input to the neural network.

The methods described herein also increase robustness of the learning compared to prior art solutions. By iterating the general training and the burn-in training several times a robust model is achieved that manages to classify most of the key samples correctly even if the model is retrained using all the original training data (except for the watermarking key samples) with the default learning rate. Hence, even a "new" model of the same type that is trained (without using the embodiments described herein, e.g. if a thief tries to retrain the network in order to obscure the embedded watermark) on the same training data with the trainable parameters obtained through the embodiments described herein as initial values will be detected as watermarked. In prior art, robustness against fine-tuning is typically shown for the final learning rate of the training, which is smaller than the default learning rate in re-training. Hence watermarking according to the embodiments described herein shows robustness for bigger modifications of the watermarked model.

The training procedure with iterative burn-in and general training has also been shown to increase the confidence in the burn-in samples without decreasing the generalization of the model. Hence iterative training is an effective way to burn-in the key samples to create more distinct and robust watermarks.

The described embodiments and their equivalents may be realized in software or hardware or by a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device) comprising circuitry/logic or performing methods according to any of the embodiments. The electronic apparatus may, for example, be a portable or handheld mobile radio communication equipment, a mobile radio terminal, a mobile telephone, a base station, a base station controller, a pager, a communicator, an electronic organizer, a smartphone, a computer, a notebook, a USB-stick, a plug-in card, an embedded drive, a robot or a mobile gaming device.

According to some embodiments, a computer program product comprises a computer readable medium such as, for example, a diskette, CD-ROM, Universal Serial Bus (USB) and blue ray disc. The computer readable medium may have stored thereon a computer program comprising program instructions. The computer program may be loadable into a data-processing unit (e.g. a CPU or GPU or similar), which may, for example, be comprised in a mobile terminal. When loaded into the data-processing unit, the computer program may be stored in a memory associated with or integral to the data-processing unit. According to some embodiments, the computer program may, when loaded into and run by the data-processing unit, cause the data-processing unit to execute method steps according to, for example, the methods shown in any of the FIGS. 1-3.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

The figures and embodiments relating to them described herein are connected. Hence, any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely for illustrative purpose and by no means limiting. Instead, all variations that fall within the range of the claims are intended to be embraced therein.

The invention claimed is:

1. A method for training a neural network and embedding a watermark in the neural network, the watermark for proving ownership of the neural network, the neural network comprising a plurality of trainable parameters associated with a number of network nodes, the method comprising:
    splitting the plurality of trainable parameters into a first set of trainable parameters and a second set of trainable parameters;
    inputting a first set of training samples to the neural network;
    training the neural network by iterating the first set of training samples through a neural self learning network to update the first set of trainable parameters and preventing the second set of trainable parameters from being updated during iteration of the first set of training samples;
    inputting a second set of training samples, to the neural network; and
    embedding the watermark by iterating the second set of training samples through the neural network to update the second set of trainable parameters and preventing the first set of trainable parameters from being updated during iteration of the second set of training samples.

2. The method according to claim 1, wherein the first set of trainable parameters and the second set of trainable parameters form parallel layers in the neural network, and wherein the method further comprises iterating the first set of training samples and the second set of training samples through the respective set of trainable parameters in sequence.

3. The method according to claim 1, further comprising:
    choosing the second set of training samples to comprise a first number of training samples; and
    choosing the second set of trainable parameters to comprise a second number of trainable parameters, wherein the first number is smaller than the second number.

4. The method according to claim 1, wherein the first set of training samples comprises general training samples for training the neural network, and wherein the second set of training samples comprises training samples for watermarking.

5. The method according to claim 4, further comprising training the neural network to associate the training samples for watermarking of the second set of training samples with an unexpected class.

6. The method according to claim 1, wherein the second set of training samples comprises training samples from the first set of training samples.

7. The method according to claim 1, wherein the second set of training samples comprises training samples from the first set of training samples that have been misclassified by the neural network during iteration of the first set of training samples.

8. The method according to claim 1, wherein the second set of training samples comprises training samples unrelated to the first set of training samples.

9. The method according to claim 1, wherein the second set of training samples comprises training samples formed by noise.

10. The method according to claim 1, further comprising iterating the second set of training samples through the second set of trainable parameters until a classification confidence associated with the second set of training samples is above a confidence threshold.

11. The method according to claim 1, further comprising extracting the embedded watermark by:
    inputting at least one key sample to the neural network, wherein the at least one key sample is associated with the embedded watermark; and
    evaluating an output from the neural network by performing at least one of:
        determining that a confidence value associated with the output of the at least one key sample inputted to the neural network is above a confidence threshold; and
        determining that a predetermined subset of network nodes of the number of network nodes are activated when the at least one key sample is inputted to the neural network.

12. A non-transitory computer readable storage medium having stored thereon a computer program comprising program instructions configured to be loadable into a data-processing unit, comprising a processor and a memory associated with or integral to the data-processing unit, when loaded into the data-processing unit, the computer program is configured to be stored in the memory, the computer program, when loaded into and run by the processor is configured to perform a method for training a neural network and embedding a watermark in the neural network, the watermark for proving ownership of the neural network, the neural network comprising a plurality of trainable parameters associated with a number of network nodes, the method comprising:
    splitting the plurality of trainable parameters into a first set of trainable parameters and a second set of trainable parameters;
    inputting a first set of training samples to the neural network;
    training the neural network by iterating the first set of training samples through the neural self learning network to update the first set of trainable parameters and preventing the second set of trainable parameters from being updated during iteration of the first set of training samples;
    inputting a second set of training samples, to the neural network; and embedding the watermark by iterating the second set of training samples through the neural network to update the second set of trainable parameters and preventing the first set of trainable parameters from being updated during iteration of the second set of training samples.

13. An apparatus for training a neural network and embedding a watermark in the neural network, the watermark for proving ownership of the neural network, the neural network comprising a plurality of trainable parameters associated with a number of network nodes, the apparatus comprising a controller configured to cause:
splitting of the plurality of trainable parameters into a first set of trainable parameters and a second set of trainable parameters;
inputting of a first set of training samples to the neural network;
training of the neural network by iteration of the first set of training samples through the neural self learning network to update the first set of trainable parameters and preventing the second set of trainable parameters from being updated during iteration of the first set of training samples;
inputting of a second set of training samples, to the neural network; and
embedding of the watermark by iteration of the second set of training samples through the neural network to update the second set of trainable parameters and preventing the first set of trainable parameters from being updated during iteration of the second set of training samples.

14. The apparatus according to claim 13, wherein the first set of trainable parameters and the second set of trainable parameters form parallel layers in the neural network and wherein the controller is further configured to cause iteration of the first set of training samples and the second set of training samples through the respective set of trainable parameters in sequence.

15. The apparatus according to claim 13, wherein the controller is further configured to cause:
choosing of the second set of training samples to comprise a first number of training samples; and
choosing of the second set of trainable parameters to comprise a second number of trainable parameters, wherein the first number is smaller than the second number.

16. The apparatus according to claim 13, wherein the first set of training samples comprises general training samples for training the neural network, and wherein the second set of training samples comprises training samples for watermarking.

17. The apparatus according to claim 13, wherein the controller is further configured to cause training of the neural network to associate the training samples for watermarking of the second set of training samples with an unexpected class.

18. The apparatus according to claim 13, wherein the second set of training samples comprises training samples from the first set of training samples.

19. The apparatus according to claim 13, wherein the second set of training samples comprises training samples from the first set of training samples that have been misclassified by the neural network during iteration of the first set of training samples.

20. The apparatus according to claim 13, wherein the second set of training samples comprises training samples unrelated to the first set of training samples.

21. The apparatus according to claim 13, wherein the second set of training samples comprises training samples formed by noise.

22. The apparatus according to claim 13, wherein the controller is further configured to cause iteration of the second set of training samples through the second set of trainable parameters until a classification confidence associated with the second set of training samples is above a confidence threshold.

23. The apparatus according to claim 13, wherein the controller is further configured to cause inputting of at least one key sample to the neural network, wherein the at least one key sample is associated with the embedded watermark and to evaluate an output from the neural network by performing at least one of:
determination of that a confidence value associated with the output of the at least one key sample inputted to the neural network is above a confidence threshold; and
determination of that a predetermined subset of network nodes of the number of network nodes are activated when the at least one key sample is inputted to the neural network.

* * * * *